United States Patent [19]
Feuerherm

[11] Patent Number: 5,102,588
[45] Date of Patent: Apr. 7, 1992

[54] METHOD OF CONTROLLING THE POSITION OF AN EXTRUDED PREFORM IN A BLOW MOLD

[76] Inventor: Harald Feuerherm, Alfred-Delp-Strasse 1, D-5210 Troisdorf, Fed. Rep. of Germany

[21] Appl. No.: 701,650

[22] Filed: May 15, 1991

Related U.S. Application Data

[63] Continuation of Ser. No. 348,443, May 8, 1989, abandoned.

[30] Foreign Application Priority Data

May 12, 1988 [DE] Fed. Rep. of Germany ....... 3816273

[51] Int. Cl.⁵ .................. B29C 49/04; B29C 49/78
[52] U.S. Cl. .................. 264/40.4; 264/40.2; 264/40.5; 264/40.7; 264/541; 425/140; 425/148
[58] Field of Search .............. 264/40.4, 40.5, 536, 264/541, 40.1, 40.2, 40.3, 40.7; 425/140, 148

[56] References Cited

U.S. PATENT DOCUMENTS

| | | | |
|---|---|---|---|
| 3,629,382 | 12/1971 | Fogelberg et al. | 264/541 |
| 3,795,719 | 3/1974 | Morecroft et al. | 264/541 |
| 4,179,251 | 12/1979 | Hess et al. | 425/140 |
| 4,338,071 | 7/1982 | Daubenbüchel et al. | 264/40.4 |
| 4,474,716 | 10/1984 | Daubenbüchel et al. | 264/40.4 |
| 4,869,862 | 9/1989 | Bryan | 264/40.1 |

FOREIGN PATENT DOCUMENTS

| | | | |
|---|---|---|---|
| 60-28830 | 3/1981 | Japan | 264/40.5 |
| 8402874 | 8/1984 | PCT Int'l Appl. | 264/40.1 |

Primary Examiner—Jan H. Silbaugh
Assistant Examiner—Catherine Timm
Attorney, Agent, or Firm—Diller, Ramik & Wight

[57] ABSTRACT

A method of making tubular bodies from thermoplastic material by extruding a parison through an extruder head die slit which is then expanded in a blow mold. The position of the parison and particularly a thickened portion thereof is regulated and/or controlled relative to critical cross-sectional regions of the hollow body blown therefrom. The hollow body of the separated lower waste portions and/or the net weight of the hollow body is measured in order to control and/or regulate the position of the thickened portion of the parison and to change the die slit as need be upon deviation from a reference value. The latter is particularly beneficial in accumulation head operation, while in continuous operation, either the hollow body net weight and the weight of the lower waste-portion is measured and compared with a reference characteristic or the hollow body net weight is compared to a reference characteristic and markings reflective of the critical cross-sectional regions of the blown article are sensed.

13 Claims, 7 Drawing Sheets

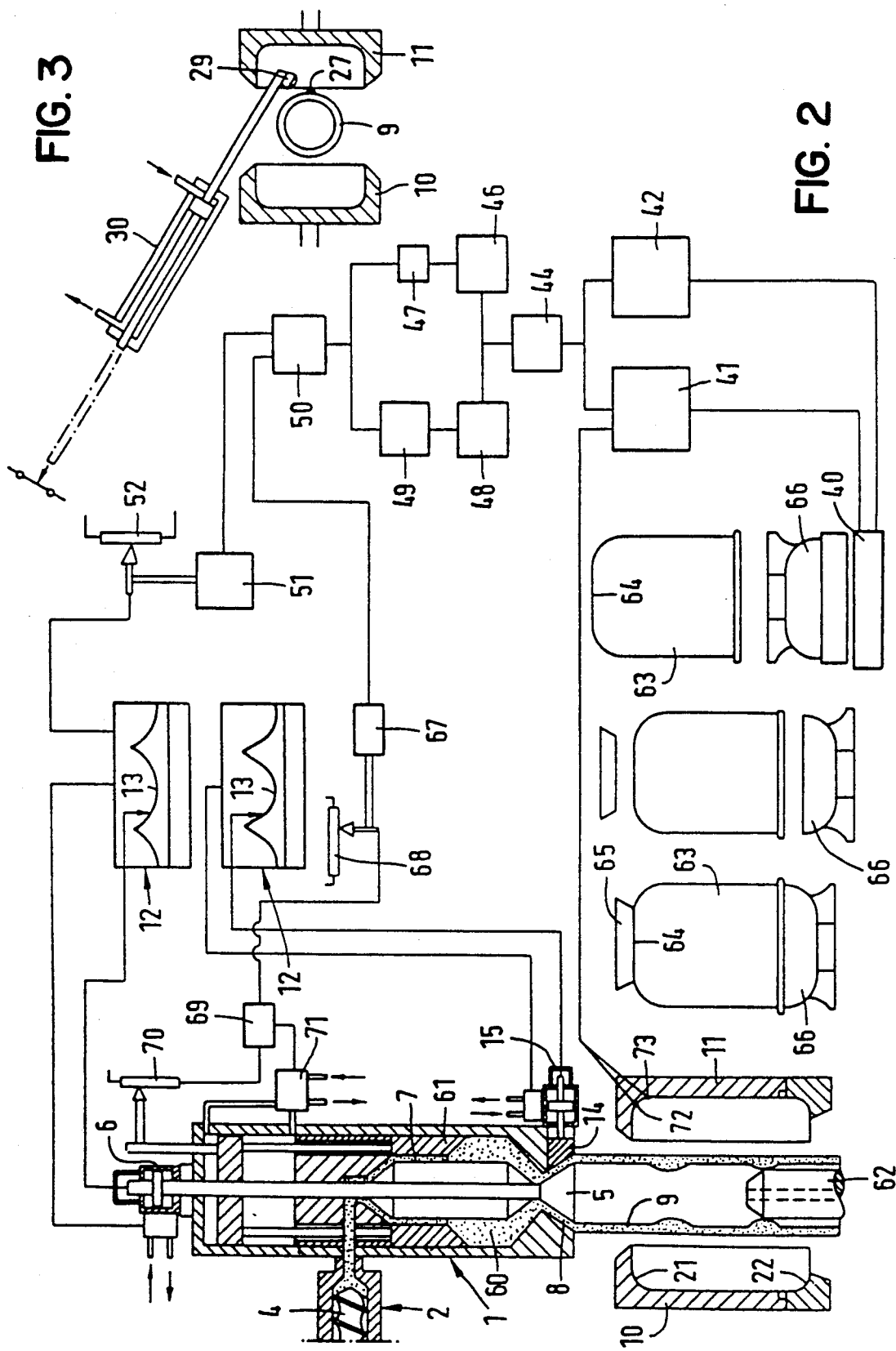

METHOD OF CONTROLLING THE POSITION OF AN EXTRUDED PREFORM IN A BLOW MOLD

This application is a continuation of application Ser. No. 07/348,443, filed May 8, 1989; now abandoned.

The invention concerns a method for extrusion blow-molding a hollow body from a thermoplastic material.

BACKGROUND OF THE INVENTION

To manufacture hollow thermoplastic bodies, for instance cans or other containers, essentially two kinds of machines are used in practice. One type employs a continuously activated extruder followed by an extruder head from which a tubular pre-molded article exits at the lower end. The other type of machine uses an accumulator head. By means of a materials plunger, the plastic in the accumulator space is always pressed out into a tubular pre-formed article or item. Accordingly this pressing takes place discontinuously. Because the hollow bodies may assume the most diverse shapes, and where furthermore the pertinent wall zones may be subjected in practice to especially high mechanical stresses, a wall-thickness program is set up over the length of the particular preformed items. Presently the wall-thickness programming is carried out using conventional control means. Equipment is available for programming the wall thickness in the longitudinal direction and furthermore to control the wall thickness over the periphery of the preformed item. Illustratively the cross-section in the extruder head or in the accumulator head is varied over the entire periphery or only in places, whereby a preformed item is obtained which evinces variable wall thicknesses over its length and possibly also in parts of its periphery.

It is already understood at the present time that it is important to secure a reliable wall-thickness distribution of the preformed item. This is important when, besides the wall-thickness distribution in the longitudinal direction, the preformed item also shall have a variable wall-thickness distribution over its periphery. This is the case illustratively when manufacturing cans. In such cases the programmed points, following the stretching of a preformed item into a can in the blowing mold, are located in the narrow zones between the upper wall and the lower wall on one hand and on the other hand on the sidewalls, are provided with extremely large wall thickness because the wall-thickness program for the radial wall-thickness control allows shifting this excess of material into the areas of more substantial stretching. These extreme points in the present program can be stretched only when using a partial or radial wall-thickness control, because in that case this material also can be shifted in the peripheral direction and no material accumulations may take place in undesired places, for instance near the mold parting lines. The more extremely the program curve must be stretched in particular zones or in relation to particular program points, the more precisely too the material pertinent to those points and subjected to the largest stresses must be present at the proper site in the blow mold. Deviations of more than ±1% relative to the height of the blow mold entail significant degradation in quality. Illustratively, warping takes place in the hollow body and substantially lower strain resistance and other degradations in strength are incurred in the finished hollow body.

In addition, about 50% of the manufacturing costs are material costs. The materials paid for by the customer are fewer, and they may not degrade the mechanical properties. Because of problems involving product liability, quality control of the hollow bodies will be mandatory. High quantitative output with reasonable warping is required and assured by keeping constant previously determined wall thicknesses. Because as a rule poorer mechanical property values cannot be accepted as tradeoffs, the input weight must be increased and thereby more warping of the hollow body or a lowering in output must ensue.

In practice a number of requirements are placed on the hollow body. The table at the end of the specification lists on one hand such criteria and on the other the main steps affecting them. The abbreviations used in the table mean the following: PWTC=partial (radial) wall thickness control; SFDR=static, flexible, deforming ring.

To optimize a hollow body in the light of the criteria of this table, in particular to achieve good mechanical properties, and, depending on the difficulties raised by the hollow body, an expert will need from one to five days' set-up work at the machine. Optimal values then can be achieved only for extreme wall thickness program curve peaks.

The interfering factors can be listed as six different groups and entail the following defects:

(a) Varying extruder output and therefore variable lengths of the preformed items; as a consequence, while the net weight of the hollow body stays constant, the critical points, or the critical cross-sectional zones will be displaced within the blow mold.

(b) Varying swelling of the preformed item and thereby variable length of this preformed item; as a consequence, the net weight of the hollow body varies, and the critical points, or the critical cross-sectional zones are displaced.

(c) A varying lower edge at the preformed item in spite of a constant hollow body net weight and a length of the preformed item regulated to be constant at the measurement point results in the absence of a constant gross or preformed weight; as a result, while the hollow body net weight is constant, the critical points, or the cross-sectional zones, are displaced.

(d) In spite of constant weight and length of the preformed item, a varying molding time causes a displacement of the wall-thickness distribution toward the blow mold because of varying shrinkage and/or sagging.

(e) Varying tendency to stretching caused by different plastics, that is different viscosities, temperatures etc. enhances the defects in final stretching for extremely peaked wall-thickness points.

(f) Excessively lengthy compensation of a defect, most of all when starting the machine and when converting to other weights, materials, molds and sizes of hollow bodies etc. entails excessive production shutdown.

The expression "tendency to stretching" means the following behavior of the material. It is constantly found in practice that the material will elongate differently. The main causes are variable distributions in viscosity, different temperatures, different wall thicknesses in the preformed item up to the notch effect and different orientation of the plastic molecules of the plastic material, even if during the production of the plastic and during further treatment every technical means is employed to arrive at as homogeneous a material is possible.

In order to properly assess the pertinent state of the art discussed below, the possible defects listed above must be taken into account.

The periodical MASCHINENMARKT 1973, vol. 7, pp 118-20 discloses keeping the length of the preformed item as uniform as possible by adjusting the width of the extruder die slit. Using an accumulator head, the volume of the preformed item is kept constant by means of preset accumulation stroke. If now furthermore the plastic material, the temperature, the output rate and the pressure on the material remain constant, then the gross weight of the produced hollow body shall also be constant. On account of the main interfering factors elucidated below, the lengths of the preformed items will vary and attempts will be made to compensate for these variable lengths by a device seizing the lower edges of the preformed items and by subsequently regulating the extruder slit. The goal is always to use the length of the preformed item to move the wall thickness programming preset for the preformed item into the right position relative to the blow mold. However the expert cannot achieve this because of the defects (c) through (e). He obliterates the set, optimal wall thickness program or, in plainer words, any peaks in the program curve are rounded off. As a result differences in wall thickness arise with commensurate degraded mechanical properties, warping of the hollow bodies, and most of the time the bodies are of excessive weight.

The European Offenlegungsschrift 84 90 0506 discloses a method of regulating the wall thickness of thermoplastic tubular preformed items in which the position of these preformed items relative to the blow mold are monitored by a pickup, preferably a photocell, whereupon the preformed items are each widened in a blow mold by means of the inside pressure and lastly the position of each preformed item relative to the blow mold is controlled in relation to at least one predetermined cross-sectional zone of the pre-formed item. This document further discloses marking the preformed item in one or more places upon expiration of the wall thickness program. The mark(s) is sensed by a pickup head to permit the introduction of suitable control steps. However, it is impossible to simultaneously keep constant or regulate the net weight of the hollow body.

Moreover, apparatus is known from the German Offenlegungsschrift 29 40 418 to control the weight of a hollow thermoplastic made by blown extrusion wherein the hollow body weight is determined after it leaves the blow mold and compared to a reference value. Depending on the result of this comparison, the slit width of the discharge is adjustably controlled to regulate the volume of the material forming the preformed item. Also, a device sensing the length of the preformed item is present which emits a signal to control the motion of the blow-molded parts or of the blow mold. Lastly, a control means is included to keep as constant as possible the time within which to form a preformed item. In this instance an attempt is made such that the programmed wall thickness distribution on the preformed item shall always assume the proper position relative to the blow mold.

The following documents also are part of the pertinent state of the art, namely the USA patent document A 4 474 716 and the European patent document A 80 10 4933. The apparatus disclosed in these documents is capable within its design limits of compensating for fluctuations during production by varying extruder output and preformed item thickness as regards long term. In practice, however, it was found impossible to position the critical points of the wall thickness program and hence the critical cross-section zones into the proper position relative to the blow mold. The reasons for this failure are the following: The attempt is made to keep constant the net weight. However this is impossible for a fixed position of the preformed item with the right length if there is a different lower edge in the preformed item (defect (c)) Even when the pickup is located at the most advantageous middle between a concave or a convex lower edge, the required average of the length of the preformed item cannot be achieved, though it is required to keep constant the preformed item weight. In addition to this different edge shape at the lower end of the preformed item, there are also further sources of defects, for instance a less than clean cut, machine vibrations and oblique tube production in an irregular manner. Because of these defects, the wall thickness points are shifted at the hollow body.

Furthermore, the time between sensing the length of the preformed item and the fixation of the preformed item by the blow mold is not constant, that is, there is no constant mold dwell time (defect (d)). Also, on account of the time-difference $T2-T1$ the defect (d) is incurred and thereby, also for a running machine, shifts of the wall thickness points relative to the blow mold on account of shrinkage and/or sagging.

It must moreover be borne in mind that the preformed item, when being widened, evinces a variable tendency to stretching on account of differences in viscosity and in material temperature, as a result of which differential stretching of the critical points or critical cross-sectional zones takes place. When using the required partial wall-thickness control, these said shifts increase further (defect (e)); this is explained also in relation to FIG. 7.

Also, the optimization during machine adjustment—which can only be carried out by a specialist—and the levelling procedure, especially in the start-up phase, take much too long in the known equipment, because the superposition of three control loops renders this equipment suitable only for stabilizing production. When starting up, especially on Monday mornings, and until the temperature matches that of the components adjoining the flow duct, or if there are movements of the blow mold etc., substantial deviations from the reference values will be incurred.

Further deviations will be incurred by changes during the optimization stage and when converting to other weights, materials, sizes of hollow bodies etc (defect f)).

Moreover it is known from the periodical KUNSTSTOFFBERATER 2/1977, pp 78 through 81 and 87, further 6/1978, pp 310 through 314 and 319, 320, and also from the Technical Report of the INSTITUT FUER KUNSTSTOFFVERARBEITUNG of the Aachen "Technische Hochschule", by S Dormeyer, PhD, namely "On automating Blow-Extrusion" to define the waste-portion length or the waste-portion weight as the measure of the length of the preformed item. The point in this essentially is to achieve a minimum waste-portion length and it is suggested to that end to control both the rate of extrusion and the angular screw speed, besides the length of the preformed item. It is suggested in addition to employ a continuous measurement method for the waste-portion length in lieu of the known light barriers located underneath the blow mold. Also, the waste-portion length or the waste-portion weight is considered being a measure of the optimal processing length. In every case the object is to achieve constant waste-portion length and also a constant length of the preformed item. However such control is by means of light barriers which also serve to measure the rate of extrusion.

The periodical KUNSTSTOFFE 70 (1980), 9, pp 522 through 524 discloses a device for controlling the blown part weight. This device operates in such a manner that blown parts made by the blow mold facility first arrive at a density testing station. The blown parts which are defect-free pass on to a digital weighing scale to sense the blown part weights for weight control purposes. The control loop for the weights, in addition to said scale, also includes a micro-processor controlled unit and motor potentiometer for automatically adjusting the slit in the wall thickness program as the adjusting means. Said scale also includes a photocell that releases the weight value to the computer.

The German Offenlegungsschrift 31 14 371 also is part of the relevant state of the art. It clearly instructs the expert of the practical difficulties of extrusion control. Return forces in or sagging of the preformed item additionally hamper the association of the wall thickness program with the blow mold. Therefore, in the light of the particular operational state and the materials data, a relation is obtained between the measured exit length and an effective length of the preformed item, this information is fed into a comparator. These additional steps are accepted to achieve a more accurate association of the wall thickness program on the preformed item relative to the blow mold. But additional drawbacks are incurred, namely, no control of the net weight of the hollow body will ensue. Moreover the defects (c) through (e) will arise.

The sources causing defects when controlling by means of the lower edge of the preformed item therefore are essentially the following, both as regards continuous extrusion and accumulator head operation: a messy cut or uneven separation of the preformed item underneath the head, variable support air and support air pressure, machine vibrations, oblique tube runs, back deformation or shrinkage or weight, tube sagging at different times between finishing the preformed item and closing of the blow mold, and pre-extrusion in accumulator head operation.

On the other hand it is the object of the invention to create a method whereby on one hand the proper position of the preformed item is secured relative to the blow mold at its critical cross-sectional zones, and on the other hand the proper weight of the hollow body to be manufactured is assured.

BRIEF DESCRIPTION OF THE DRAWINGS

FIG. 2 is another overall plant of different design with an extruder head comprising an accumulator head, FIG. 3 is a horizontal section of a construction detail of FIG. 1 and of FIG. 2, FIGS. 4 through 6 are schematic views illustrating the regulation or control steps.

FIG. 1 is an overall schematic of a plant with a continuously operating extruder head 1 to the upper end of which is connected an extruder 2 with a screw 4 driven by a motor 3. A vertically displaceable and height-adjustable mandrel 5 is mounted inside the extruder head 1. The adjustment of the mandrel 5 is implemented by a device 6 at the upper end face of the extruder head—for instance by a hydraulic system. A cylindrical space 7 is present between the extruder head 1 and the mandrel 5 and is filled from the extruder 2 with a thermoplastic which in the cylindrical space is molded into tubular form. The cylindrical space 7 forms at its lower end a die slit 8 from which a preformed item 9 is extruded and arrives in the region of a blow mold formed by blow mold parts 10 and 11. The mandrel 5 is height-adjusted by a microprocessor-controlled programming system 12 in relation to a program curve 13, so that the cross-section of the die slit 8 shall be larger or smaller and accordingly so that the wall thickness of the preformed item 9 shall be increased or decreased. The partial control of the wall thickness may be carried out by a system 14 driven by an adjustment means 15, whereby also the wall thickness may be varied along the periphery of the preformed item, and also controlled by the program system 12 though with a different program curve.

The two blow mold halves 10 and 11 are actuated by a pneumatic or hydraulic system 16. FIG. 1 only shows the left actuation system, however the right blow mold 11 also is equipped with a corresponding actuator through the attachment 17. The actuators are connected to a control system through a servo-valve 18, a comparison and regulating means 19, and a timing member 20.

Figure 1:
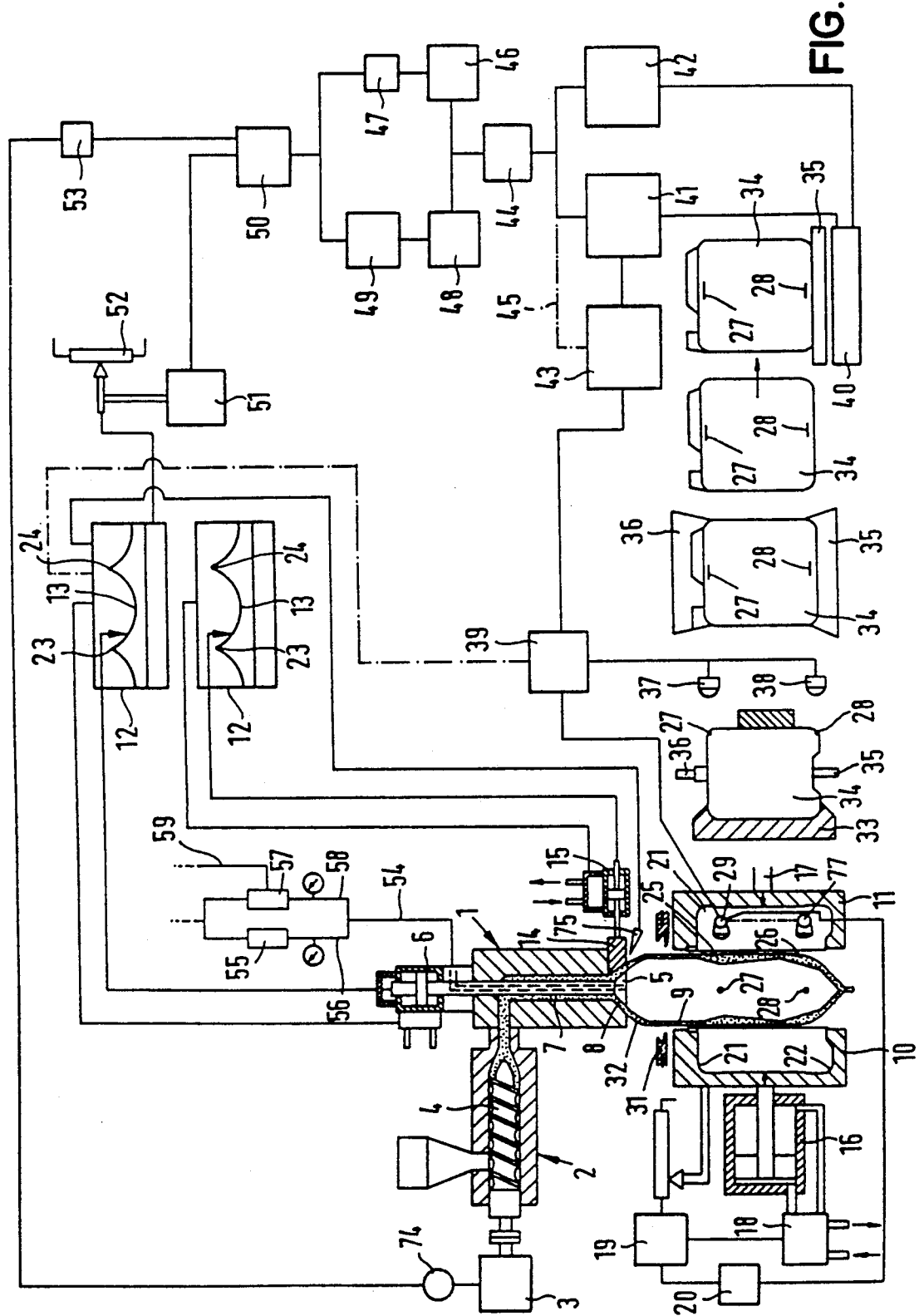
FIG. 1 shows the entire plant with a continuously operating extruder head and also with an associated regulating and control device.

The present embodiment concerns the manufacture of cans having an especially critical zone located at the can shoulder corresponding to the site 21 of the can and on at least part of the periphery relating to this site. Another critical zone is at the bottom edge of the hollow body corresponding to site 22 in the blow mold, again as seen at least over part of the periphery. In this embodiment the program curve 13 comprises two steep peaks 23 and 24 which, however, are automatically rounded off by interpolating the program curve. In relation to the peaks 23, 24, the preformed item is endowed with especially thick walls in two zones 25 and 26.

In association with the two critical zones 25, 26 two markings 27 and 28 are advantageously provided externally on the preformed item by a marking system 75 and are illustratively used by the operating personnel to check the position of the critical points. If the position should be outside tolerance while the weight check proves satisfactory, a new, lower slug reference weight will be set. Again, such markings may be sensed prior to closing the blow mold by a pickup 29 or 77. As shown in FIG. 3, the pickup 29 or 77 may be moved into the blow mold by a telescoping pneumatic or hydraulic system 30 and be withdrawn before the blow mold is closed. As shown in FIG. 1, the markings 27, 28 may be provided externally near the blow mold's parting plane and/or may be offset by 90°, as shown in FIG. 3, in a plane that is normal to the parting plane. This depends on the shape of the hollow body and/or of the blow mold. The timing member 20 may be for a dual purpose, namely on one hand to emit the pulses for moving the pickup 29 in and out, and on the other hand the timing member 20 may preset the time required to close the blow mold parts 10, 11 and during which the preformed item moves further down. Sensing a corresponding time difference will be needed for the the preformed item to arrive in the desired, proper position relative to the blow mold parts 10, 11. If the closure of the blow mold parts 10, 11 is made dependent on sensing the marking 27, then appropriately the time from sensing the marking till the fixation of the preformed item by the blow mold parts 10, 11 shall be kept constant, that is, equal shrinkage or sagging. This requires to so height-adjust or set the pickup 29 that upon sensing of the marking 27 by the pickup 29, machine operation shall be delayed directly or by means of a timing member and the preformed item shall be so sensed that the critical point KP1' (FIG. 7) shall coincide with the marking. This motion can be so adjusted as to achieve constancy also in the start-up stage wherein the speeds initially are low. In another advantageous embodiment of the invention, the marking also may be compared illustratively in the mask and where called for the sensor 29 may be height-adjusted, for instance in an automatic manner. In this respect, the timing member 20 may be used in combination with controlled blow-mold closure motion.

After the blow mold parts 10, 11 have been closed, the preformed item 9 is separated by a separating device 31 from the following tube 32. Directly thereafter the blow mold parts 10, 11 are moved into a blowing station where an omitted blow means inflates the preformed item 9 and expands the preform item 9 against the wall of the blow mold. Once the blow mold parts 10, 11 have has been reopened, the hollow body is removed in a mask 33 to the outside. In that state the hollow body 34 comprises a lower waste-portion 35 and an upper waste-portion 36 produced during the squeeze-off at the blow mold. Advantageously and possibly following a 90° rotation about a vertical, the hollow body 34 is associated with pickups 37 and 38 which accurately sense whether the markings 27 and 28 are at the right places or whether and to what extent deviations are present. The measured values from the pickups 37 and 38 and 29 are fed to a comparison and control member 39 of the control system.

The lower waste-portion 35 and the upper waste-portion 36 now are separated from the hollow body proper 34. Thereupon the lower waste-portion 35 is appropriately laid flat on a weighing scale 40 where its weight is measured. Individually selected lower waste-portions may be manually deposited on the scale. However it is more appropriate to move all the lower waste-portions sequentially and fully automatically on the scale. In addition or alternatively the net weight of the hollow body 34 also may be measured with the lower waste-portion. For that purpose there may be present a second scale so that the first scale can be used exclusively to weigh the lower waste-portion and the second scale is used to weigh the hollow bodies 34. The weights of the lower waste-portions are fed to a control member 41 of the control system, whereas the net weights of the hollow bodies 34 are fed to another control member 42. The comparison and control member 39 feeds the measured values regarding the markings 27, 28 to a spacing member 43 essentially evaluating the distance y2−y1 which shall be discussed further below. The members 41 through 43 are connected to an adder stage 44 which is operative only when the compared weight consists of several individual weights. Ordinarily the spacing member 43 is connected to the control member 41. However, as indicated by the dot-dash line 45, the spacing member 43 may bypass the control member 41 and be directly connected to the adder stage 44.

Beyond the adder stage 44 the control system divides into two branches. During start-up of the extruder 2, the right branch becomes operative by means of a setting member 46 and a timing member 47 whereby, any weight differences are immediately compensated for and switching to the operational phase can take place after a time preset by the timing member 47. It is possible also to switch over to the operational phase by means of other criteria, for instance, if the deviations from the reference value grow to a predetermined magnitude. After the start-up stage, the production member 48 becomes operative by means of the subsequent tendency stage 49 of the other branch. Any correction values for the die slit 8 are fed from a comparison and control stage 50 (FIG. 4) to an adjusting motor 51 driving a potentiometer 52, whereby, without being required to act on the program system proper 12, the mandrel 5 and hence the die slit 8 can be adjusted. If the comparison and control stage 50 determines a correction of the screw speed ns, then the blocking stage 53 shall be opened and the angular speed shall be changed by the adjusting motor 74. Obviously the ease of using the marking device 75 may be entirely foregone and the checks on the proper point locations may be visual, or relate to pressure, cutting and wall thicknesses. Again, if a targeted wall thickness point is shifted extremely, the position may also be monitored and it is possible to make use for that purpose of the automatically obtained markings based upon the extreme changes in wall thickness at the critical points. All these checks are carried out to manually preset a new lower stub reference weight in the control member 41 when in the presence of deviations while the checks show constant weight sections.

FIG. 1 also shows equipment to feed supporting air through the line 54 into the upper end of the extrusion head, and this supporting air can be supplied as constant air by adjusting the pressure and the rate for each step. The supply is through the valve system 55 and a line 56. In addition, time-dependent and/or controlled supporting air can be superposed on the constant air through the valve system 57 and a line 58. Such changes can be carried out by the valve systems 55 and 57. The duration of the controlled supporting air is determined electrically through a line 59. It is possible by means of the supporting air control or regulation to control and/or regulate the total length when the preformed item is closed, and thereby the spacing between two markings. At the same time the diameter of the preformed item changes. When weights are changing during production times and machine cycles, that is when there are changed quantities of air in the preformed item, adaptation may take place, for instance, upon sensing the markings.

Figure 5:
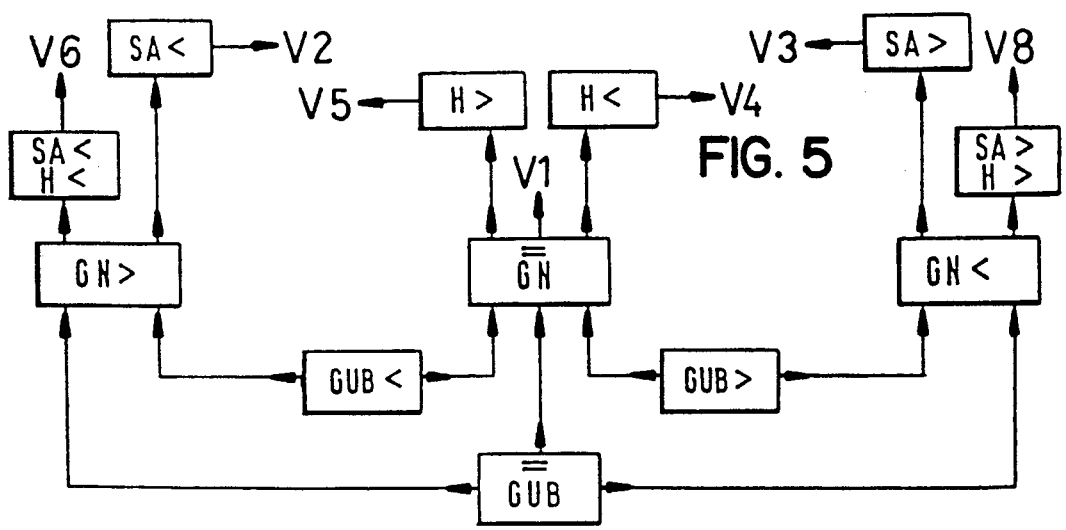

FIG. 2 shows a further embodiment of another plant of the invention assigned for storage read operation. Identical components or those operating in equivalent manner are denoted by the same reference numerals as in FIG. 1. In this case, however, the extruder head 1 is an accumulator head equipped with a storage space 60 and with a vertically adjustable hollow storage plunger 61. A feed pipe 62 to supply blowing air is schematically shown in the lower region of the blow mold. In this embodiment mode the hollow bodies consist of containers open on one side which are upwardly shaped at the bottom 64 whereby the upper waste-portion 65 shall be severed from the container bottom. The lower waste-portion which also will be separated, is also called a "dome" in the trade. This lower waste-portion or dome 66 is again fed to the weighing scale 40 as described above. In practice it is mainly specialists who program the optimal wall thickness of each different hollow body. All machine and production data are ascertained. The object of the invention is to keep constant this optimized wall thickness distribution once it has been obtained over the entire time of production and further also upon another onset of production. FIG. 5 shows the operation of the comparison and control stage. At a constant storage stroke, the same specific weight of the plastic and the same output rate, a constant gross weight of the hollow body will be produced, and therefore most of the time it suffices to keep constant only the lower waste-portion weight or the net weight. This is achieved by controlling the die slit 8. Regulation by means of the net weight is preferred when for instance production employs pre-extrusion. Pre-extrusion occurs when the die slit is inadequately closed and therefore plastic exits from the die slit during the accumulator filling procedure before the preformed item itself has been expelled.

If now the specific weight or the ejection rate of the conveyed material varies on account of different material temperatures or plastic data, then such a change shall be noted for constant lower waste-portion weight by comparison with the net weight of the hollow body 63 and shall be compensated for by means of the storage stroke. For that purpose the comparison and control stage 50 is connected to an adjusting motor 67 and a potentiometer 68 which is in turn connected to a comparison and control member 69, to a further potentiometer 70 and a servovalve 71, whereby in this case the net weight movement of the hollow storage plungers 61 is regulated as a measure of the changes in net weights. It is furthermore possible to program the changes of the specific weight as a function of the material, temperature and pressure values into the comparison and control unit 50. To monitor the position of the critical points it is again possible to resort to the approaches already described. Advantageously a wall thickness measurement 72, 73 of the hollow body in the blow mold 11 may be used as a further automatic check. Preferably ultrasonic pickups shall be used for this purpose.

Figure 4:
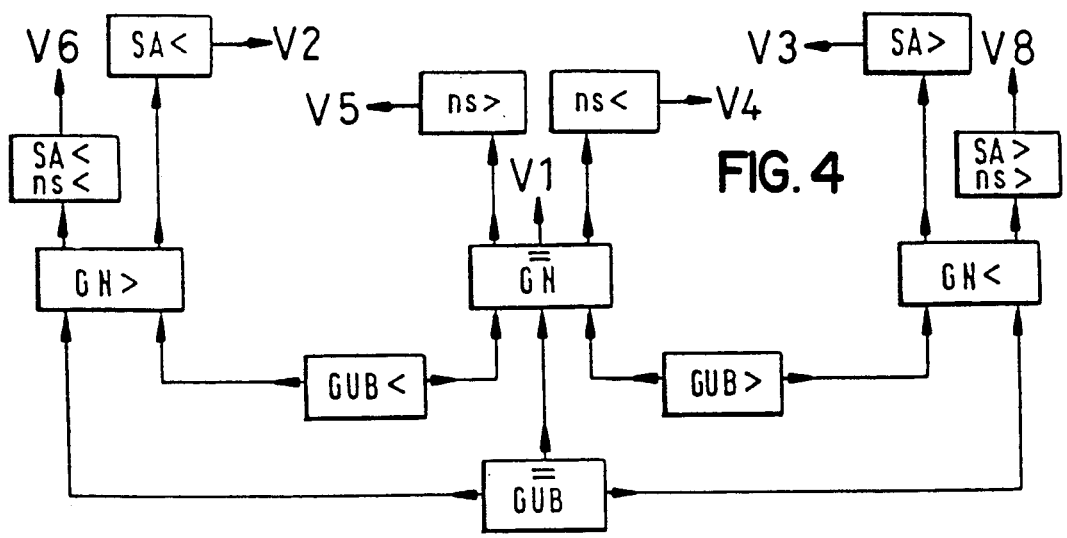
Figure 6:
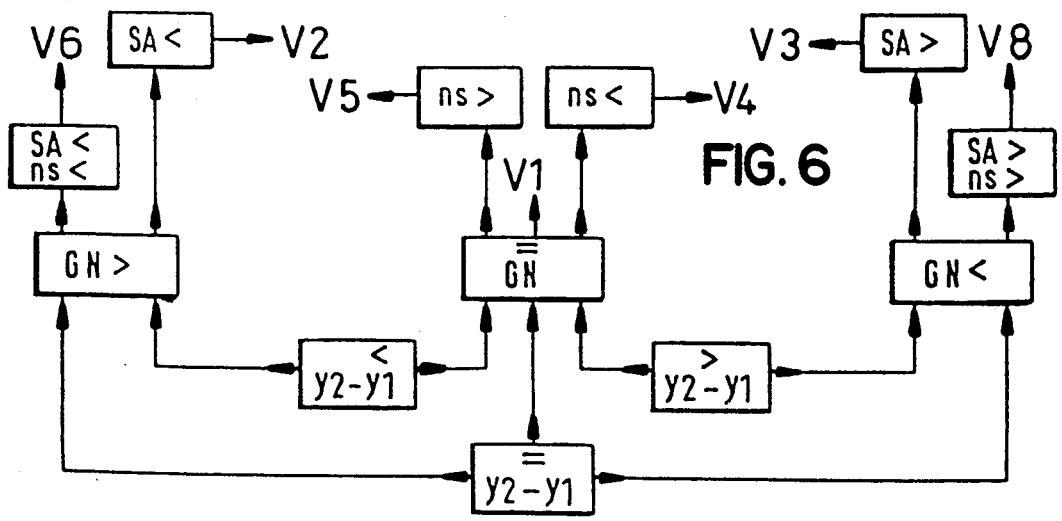

The block circuit diagrams of FIGS. 4, 5 and 6 show the operation of the comparison and control stage 50. The abbreviations denote the following:
GUB: lower waste-portion weight
GN: net weight of hollow body
ns: screw angular speed
SA: die slit
H: hollow plunger stroke
y2−y1: spacing between two check points of program curve, in particular corresponding to the program curve peaks between KP2 and KP1 relative to the preformed item and/or the spacing between KP2 and KP1 or KP2' and KP1' corresponding to the program curve peaks at the blown body.

Figure 9:
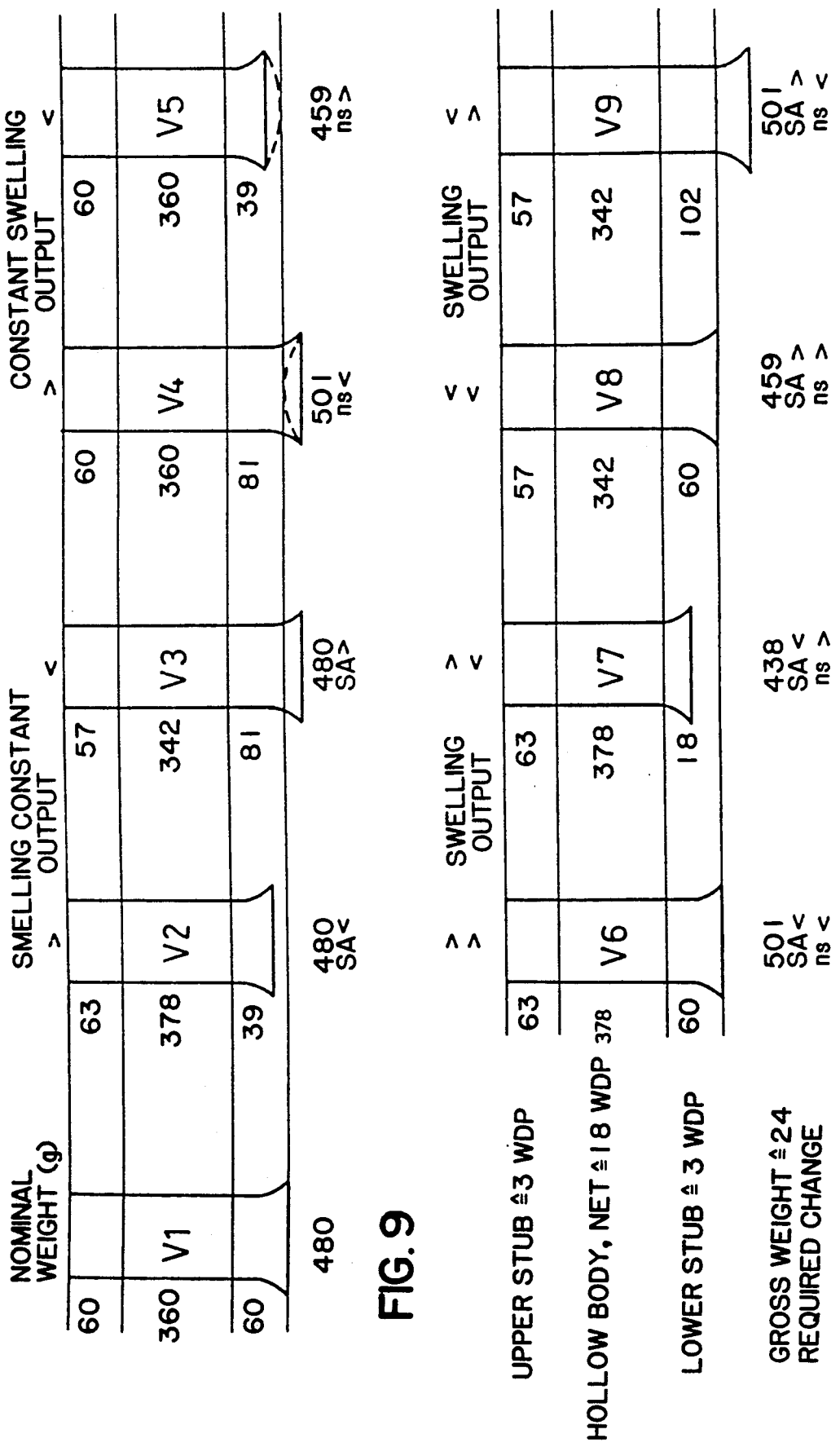
FIG. 9 shows sketches illustrating further sources of defects in the light of weight-section measurements.

FIGS. 4 through 6 show how several preformed items selected from two actually measured values and of FIG. 9 can be readjusted by means of the setpoints SA and ns or H toward the reference values, with SA, ns and H respectively denoting the die slit width, the screw angular speed and the storage stroke. The arrows show the paths. The V numbers at the end of the paths denote the path numbers simultaneously rendering the number of the preformed item of FIG. 9.

If only one value is obtained for the adjustment magnitude, the defect can be compensated for very quickly. If on the other hand both adjustment values must be considered, compensation will take somewhat longer.

FIGS. 4 through 6 actually do show more. If in the practical case a change in the plastic material has caused a change in extruder output and the swelling behavior, then comparison shall not lead to unambiguous correction steps. Because a change in the die slot by the order of magnitude required here virtually will not affect the processing parameters, it may be advantageous in this case to assign priority to the die slit correction SA over the screw angular speed ns in terms of the controls to be carried out. For that purpose provision is made of the blocking stage 53 in FIG. 1 which shall permit a change in the screw angular speed only after the correction SA has been performed. However this is also possible in the event that, for instance, the SA and ns corrections shall be made smaller, whereupon SA is then adjusted in larger steps than ns.

However, in order to more swiftly carry out this compensation, use maybe made of a comparison weight consisting of several individual weights, preferably the lower waste-portion weight and the net weight of the hollow body. Control by the sum of the individual weights offers the advantage that some knowledge has been gained concerning the total weight of the preformed item. In continuous extrusion, the total weight serves to control the screw angular speed ns and, as regards head accumulator operation, the storage stroke H.

FIG. 9 shows which weight shall most appropriately used for control purposes. If the gross weight were kept constant, only the slit width SA would have to be so adjusted that the lower waste-portion weight and/or the net weight would reach the desired reference values. In most continuously operating extrusion blow mold plants the gross weight cannot be ascertained as a whole with all the parts 34, 35 and 36 prior to the removal of the waste-portions 35 and 36. In those cases the gross weight can computed from the individual weights. In order to circumvent automatic feed of the upper waste-portions, the gross weight can be computed to a first approximation by means of the lower waste-portion weight and the hollow body net weight. Again it is possible to form a comparison weight, for instance, from the lower waste-portion weight and the hollow body net weight and to feed it to the control system. The goal sought in all cases is to rapidly adjust for interfering factors by means of unambiguous control parameters.

The following shall further serve to elucidate several important points relating to FIG. 9. The individual sketches show the changes in position and weight of an illustrative preformed item as a function of constant and variable output and as well as of constant and variable swelling. The left sketch of the upper row shows the reference weights and position of the preformed items. If on the other hand the two right sketches of the upper row are compared, then it is clear that in spite of the same net weights of the hollow body, the position of the preformed item is entirely different and hence also that of the hollow body. In the remaining variations it is clear again that merely a measurement of net weight cannot provide unambiguous determination of the preformed item and of the hollow body relative to the blow mold.

Figure 8:
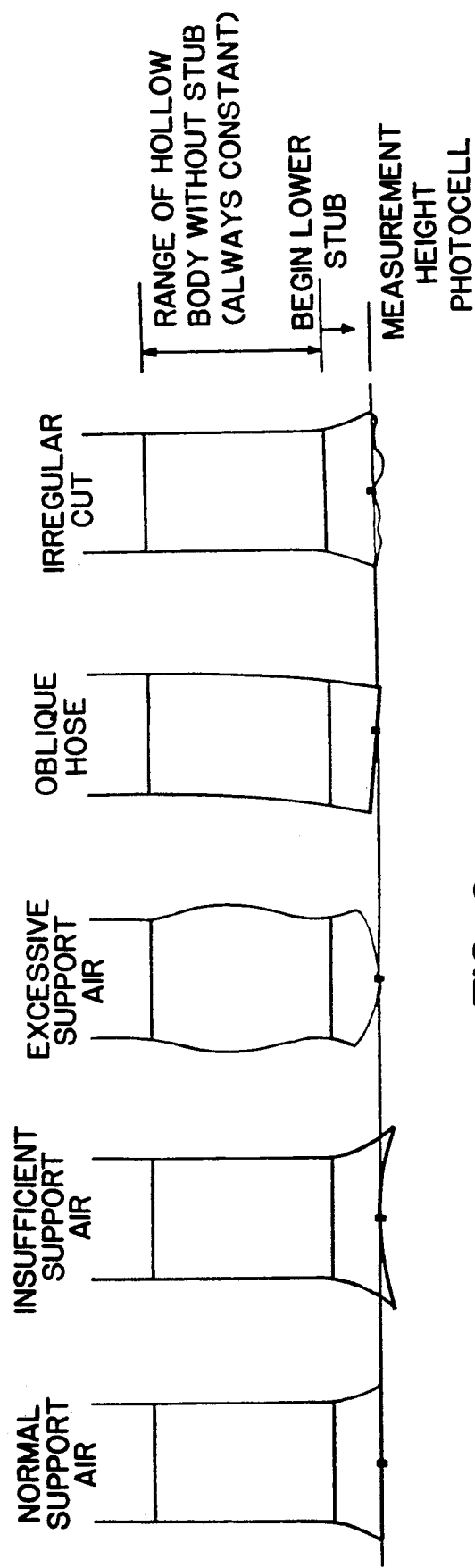
FIG. 8 shows sketches illustrating sources of defects at the lower end of the preformed item.

FIG. 8, and in this respect also FIG. 9, shows that the lower edge of the tubular preformed item and accordingly also of the lower waste-portion will only very rarely be entirely horizontal in the manner of the left-hand sketch (FIG. 8), rather that it is likely to assume the most diverse shapes, for instance being concave, convex, oblique, serrate. Therefore the precise position cannot be determined, for instance, by a height-adjustable photocell, because it is unforeseeable which point of the lower edge shall be sensed by the photocell.

In surprising manner the invention showed that in accumulation head operation and constant ejection rate for the preformed item, the weight measurement of the lower stub may suffice to control the position of the preformed item, whereby the hollow body arrives with the critical cross-sectional zones at the right position relative to the blow mold while simultaneously the hollow body net weight is kept constant.

Again, as concerns continuous operation, it was found in an unambiguous manner that a measurement of solely the net weight of the hollow body is insufficient for unambiguous position control. On the other hand it was discovered that it is advantageous in continuous operation always to use two measurement values for unambiguous position control. As shown by FIG. 4, the lower waste-portion weight and the hollow body net weight are determined. As shown by FIGS. 6 and 7, again two measurement values are used, namely the spacing $y2-y1$ and the hollow body net weight. As regards accumulation head operation, it suffices as a rule to control the die slit SA. However in addition the stroke of the material plunger may also be advantageously be regulated. In continuous operation the die slit SA and/or the screw angular speed ns will then be regulated correspondingly. FIGS. 4 through 6 provide a survey of these relationships.

It is a substantial advantage of the invention that immediately after the first measurements it is apparent which defect is involved and whether the machine is in the start-up, the optimization or the production mode. This meets the requirement of least waste material. Another advantage which must be emphasized is that by means of the effectively measured weights and/or spacings with simultaneous tolerances ranges it becomes possible for the first time to carry out unambiguous sorting, for instance, by, first, second choice etc. and rejects.

Figure 10:
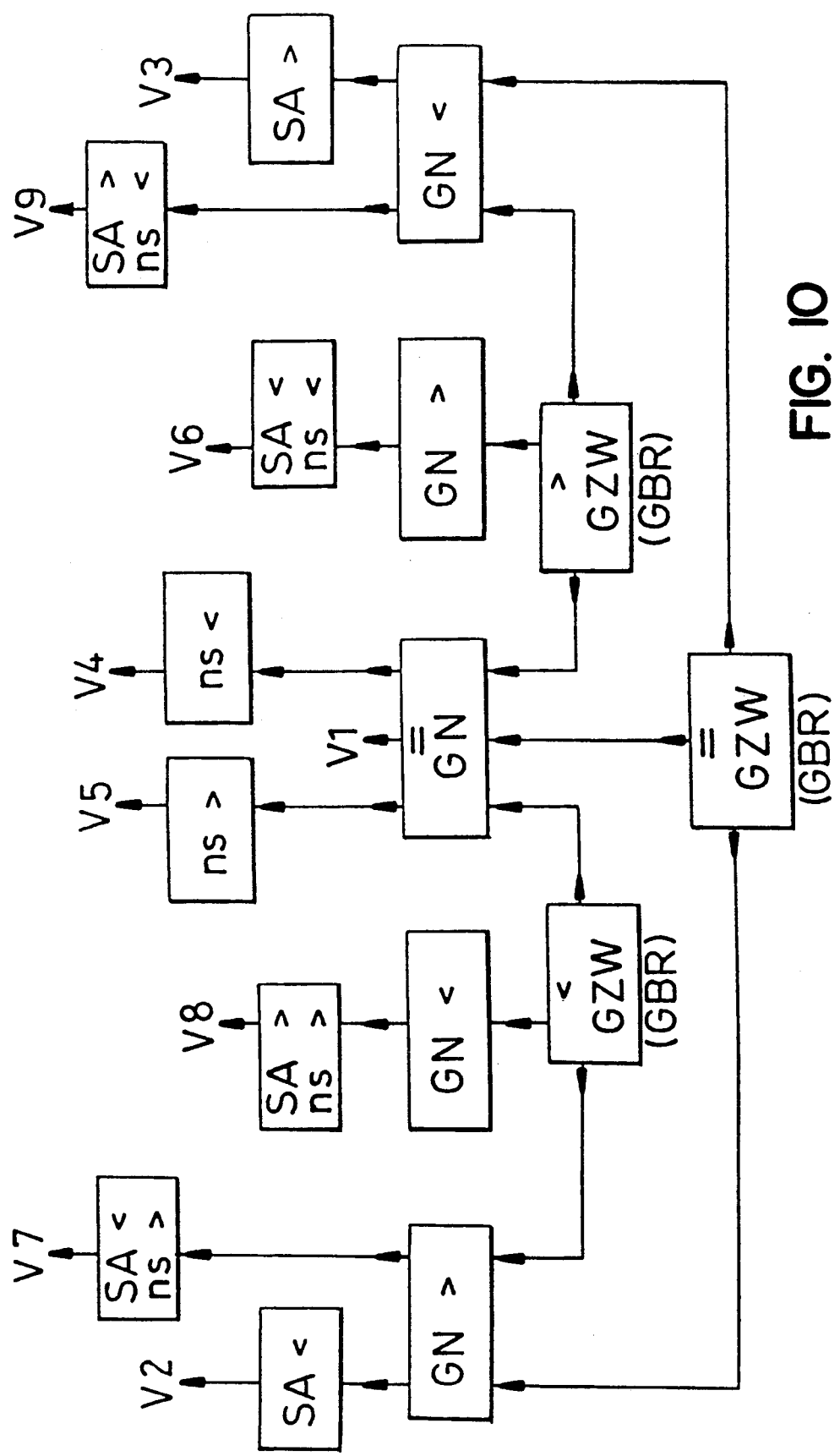
FIG. 10 is another schematic illustrating regulating and control steps.

FIG. 10 shows the operation of the comparison and control stage 50 of FIG. 1 when using the sums of several individual weights GZW in the comparison member 44.

The great advantage of this sensing and evaluation is that when two values are determined, it is at once unambiguously clear which defects are involved, so that unambiguous control values can be transmitted to keep constant both the hollow body net weight and the critical points of the hollow body and to do so even in parallel regulation in one control unit.

FIG. 10 must be considered jointly with FIG. 9. The upper left sketch of FIG. 9 shows the reference weight of the preformed item V1 which shall always be pursued. The other preformed items V2 through V9 illustrate different deviations caused by changed output and swelling. The values listed in FIG. 9 at the left bottom relate to the preformed item V1, whereby the stated value "60" corresponds to three wall thickness points for the upper waste-portion, whereas the hollow body with the value "360" corresponds to eighteen wall thickness points and the lower waste-portion's value of "60" again corresponds to three wall thickness points. Therefore the gross weight of the preformed item corresponds to twenty-four wall thickness points. As regards the preformed items V2 through V9, which differ from the preformed item V1, and besides the different shown positions and weight portions, further changes are caused by the lower edge of the preformed item possibly being furthermore convex or concave, as shown in the two right top sketches, in particular as a function of the supporting air. To describe this behavior, the corresponding lower edges of the preformed items V4 and V5 are shown in dashed form and therefore correspond essentially to the second and third sketches from the left in FIG. 8. If now for the same height of the photocell the same coincident length is detected, then in spite of the same net weights of the two preformed items V4 and V5 here denoted by the value "360", there will be entirely different weights of the lower stubs which have values of "81" and "39", respectively. A shift in the wall thickness distribution ensues, in particular of the critical wall thickness points.

Now FIG. 10 is a survey of the control system to regulate the preformed items V2 through V9 (FIG. 9) to assume the values of the desired preformed item V1. GZW denotes the sum of the individual weights, for instance the sum of the lower waste-portion weight and of the net weight, GN the comparison value of the hollow body net weight, SA one of the command values, i.e., to change the size of the die slit, and ns the control value for changing the screw angular speed. Those actual values are compared with the reference values. If illustratively at the bottom left of FIG. 10 the sum of the individual weights, GZW, and the net weight GN, when compared with the corresponding reference values, are identical, then the preformed item V1 shall be present and no changes are called for. If after the left path GZW agrees but the net weight GN is excessive, then, in the absence of regulation, the preformed item V2 would result. Changing the die slit SA so as to make it smaller will again lead to the preformed item V1 following the regulation step. The schematic of FIG. 10 must be construed in this light, that is each time in the direction of the arrows shown. If for instance as regards the preformed items V7 or V9 the sum of the individual weights, GZW, either is insufficient or excessive, then for either excessive or insufficient net weight GN the setpoints will have to be adjusted in the sense of the arrows shown and in each instance the preformed item V1 then shall be obtained. The schematic of FIG. 10 must be construed in this light for all the paths shown. To accelerate compensation, when two setpoints are being changed, then advantageously such adjustments shall take place simultaneously in opposite directions. This is made clear in FIG. 10 in relation to the preformed items V7 and V9.

Figure 7:
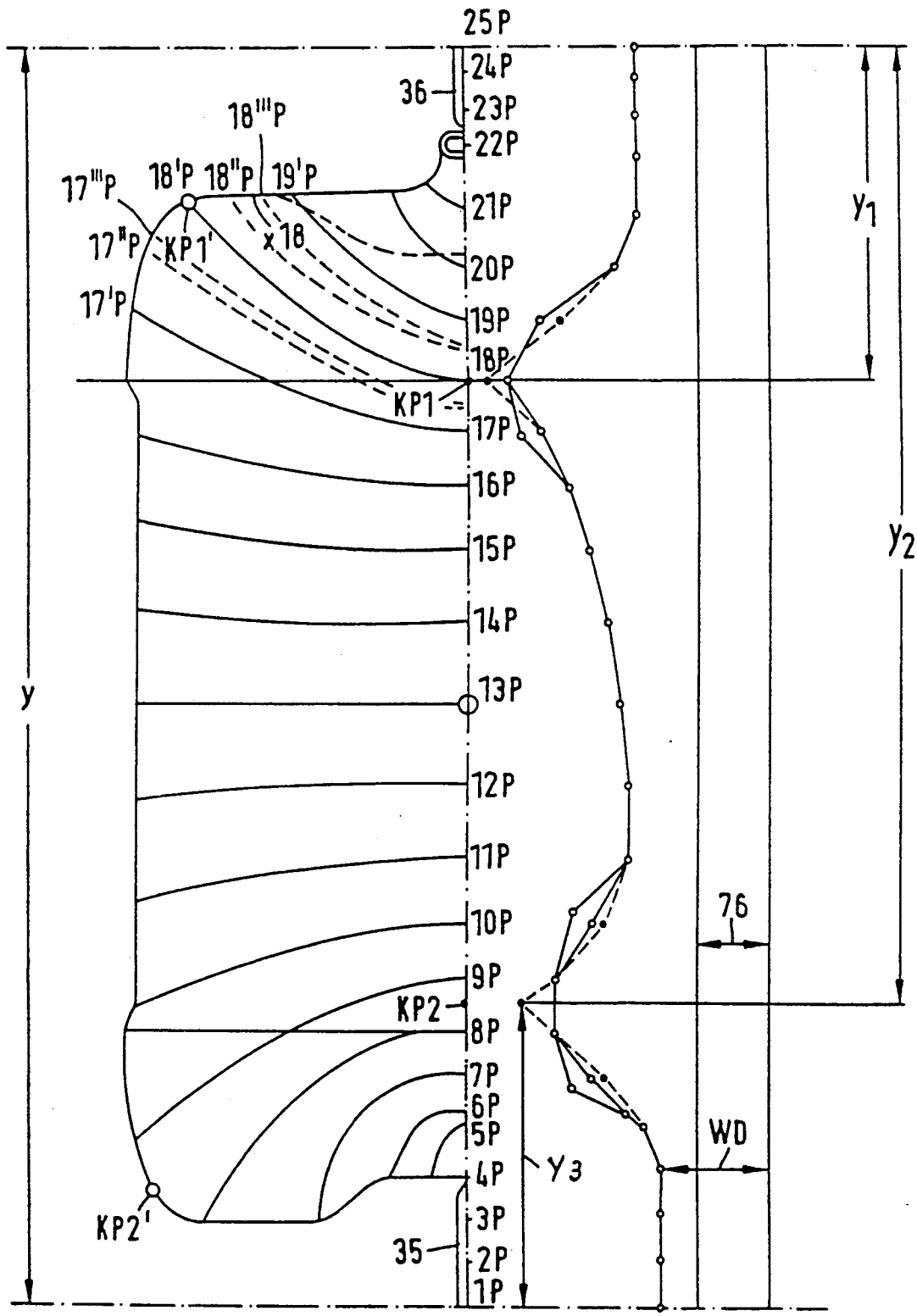
FIG. 7 shows half the contour of a can with the associated program curve.

FIG. 7 shows the stretching path when using a twenty-five point programmer with points 1P through 25P. It is seen from the spacings between the points 17P and 18P in the mold parting seam on one hand and the spacings of points 17'P and 18'P at an angle of 90° to the mold parting seam that by stretching this corner with a radius this spacing can be more than doubled. If following stretching at the critical point KP1 and at KP1' the wall thickness shall be the same, the preformed item would have to have a wall thickness at the point 18'P at least twice that at point 18P. This difference would be set by the radial wall thickness. Moreover, the wall thickness at point 18'P would have to be still higher than at points 17'P and 19'P in order to achieve optimal strain values. This requires even more extreme adjustment. If there were a half point displacement toward the wall thickness point 19'P on account of a displacement of the wall thickness program toward the blow mold, the following would ensue: The extreme thickening at the wall thickness point 18'P on account of that displacement shifts by half a space between two wall thickness points and stretches additionally by means of stiffness from point 18"P by the distance x18 toward the point 19'P as far as the point 18'"P. The wall thickness point 17'P does indeed shift by the same half space between two wall thickness points toward the wall thickness point 18'P as far as the point 17"P and, because of the additional stretching, farther yet to point 17'"P. But in this area the material was stretched only slightly. As a result, a longer stretch between points 17'"P and 18'"P will result, as would have for the points 17 'P and 18 'P respectively. This causes substantial reduction in the wall thickness at the critical point KP1' because a larger extent was stretched with the same preformed item thickness. If the many interfering factors applied to a preformed item at optimal strain values and least warping, it is clear that first of all the position of the most critical wall thickness point, in this instance the point KP1', must be moved to a position relative to the blow mold which offers the best compromise regarding the further critical points such as KP2'. The most advantageous compromise will now be illustrated in an Example. If it is found that the point KP1' is at the right place, whereas the lower critical point KP2' is displaced upward or downward, the net weight remaining constant, a step must be taken to move both critical points close to the optimal places. It may be advantageous in this respect to select a certain middle ground for both critical points, i.e., to allow both points to come somewhat closer together or move somewhat apart. Most wall thickness program means comprise at least fifty wall thickness points and therefore it is not necessary to restrict oneself to the compromise of the present Example relating to the point KP2 located between the wall thickness points 8 and 9. FIG. 7 furthermore illustrates the total lengthy of the preformed item 7, the most important spacings y1 and y2 from the critical points KP1 and KP2 and the lower and upper stubs 35 and 36.

Present day wall thickness programming means divide the preformed item volume into n − 1 equal volume segments. Here n denotes the number of the program points. As shown by FIG. 7, twenty-four volume segments result, which to a first approximation mean twenty-four equal weight sections. The following point spacings and weight proportions ensue:
y=24
y1=6.5
y2−y=9.5
GUB=3
GOB=3
GN=18
GZW=GUB+GN=21
GBR=24.

The above means that to a first approximation the y-paths corresponds to the stated point spacings. The weight proportions also are referred in FIG. 7 to these stated point spacings. As long as the weight proportion of the lower waste-portion 35 remains constant, the weight sections between the associated points also are constant, that is relative to the points associated with y1 and y2. Then the hollow body weight and that of the upper waste-portion also are constant. Advantageously the weight of the lower stub or the sum of the individual weights, GZW, shall be controlled to a constant value in any operational state that might vary from case to case, in other words, in the instance of automatic position control of the critical points, a new reference weight for the lower waste-portion or for the GZW may be determined automatically for every altered opertional state.

The variable wall thickness is denoted by the arrow WD and consists of the program curve and the base slit 76. The base slit 76 and/or the factor multiplying the program curve can be used to change the die slit. If specific measurements of wall thickness take place, the results may be used to decide on changing either the base slit 76 or multiplying the program curve factor.

FIG. 7 furthermore illustrates the dashed-line peaks of the program curve relative to the critical points KP1 and KP2 which can be made to materialize by means of the invention and be moved into the proper position relative to the blow mold, whereas in practice all of the state of the art can only move over the associated, flattened program curves shown in solid lines.

It is emphasized here that one of the essential advantages of the invention is the ability to use just one apparatus to keep constant both the hollow body net weight and the position of the critical cross-sectional zones relative to the blow mold.

A pickup was described above in relation to FIG. 3 which can be moved into and withdrawn from the blow mold. Instead an advantageous embodiment of the invention may be used in this pickup being stationary inside the blow mold. Moreover this system may be so designed that the pickup shall be height-adjustable for the purpose of keeping constant the time interval between sensing the particular marking and the fixation of the preformed item in the blow mold. As a result, the marking shall coincide with the critical cross-sectional zone.

The invention furthermore applies if in another (omitted) extrusion blow molding plant first the entire blown body is moved toward a weighing scale to determine the gross weight GBR, the waste portions being removed only thereafter. This gross weight illustratively may be used in the comparison and control stage 50 (FIG. 1) in lieu of the sum of the individual weights, GZW, and would allow regulating the storage stroke in accumulator head operation and the screw angular speed in continuous extrusion. This system also would offer the advantage to carry out the proper alteration without previous comparison with a second magnitude. The waste portions will then be removed in a subsequent station. As shown by FIG. 9 relative to the preformed items V2 and V3, both the net weight and the lower waste portions may be used as the second setpoint. Advantageously the net weight shall be used and in case of deviations the die slit SA shall be changed.

The gross weight GBR is used with the checks on the proper position of the critical points. This means that in the course of the automatic spacing check, a new gross weight reference GBR shall be fed into the spacing member 43 in lieu of a new lower stub weight GUB.

Without thereby transcending the scope of the invention, a further advantageous step may be to so regulate and/or control or set the position of the particular preformed item relative to the blow mold as a function of at least one predetermined cross-sectional zone of the preformed item, preferably a critical zone, that the length of the preformed item up to the predetermined cross-sectional zone is compared with the preset program in a wall thickness program system, and in that the part of the preformed item yet to be ejected will be so dimensioned or changed that the cross-sectional zone moves into the right position relative to the blow mold. The setting of any second, critical point would take place at constant values, as shown in FIGS. 6 and 7. Besides the steps already described, this is achieved as follows: the wall thickness program y may be expanded or shortened and the required length of the preformed item may be obtained by changing the spacings of y3 and/or y1 in such a manner that the spacings y2−y1 or KP2' and KP1' are kept constant. When the spacing is regulated jointly with a regulation of the net weight of the hollow body, the spacing control advantageously item and/or at the hollow body with simultaneous net weight regulation of the hollow body.

An advantageous embodiment of the invention is achieved by providing a row of horizontal photocells or a horizontal light strip to sense the position of the preformed item and in that an average is formed of the points of different heights. Such a light strip or row of photocells may illustratively be used to sense any edges, projections, markings and the like anywhere over the height of the preformed item or of the ejected blown body. This is important when such sites to be sensed are substantial in the horizontal direction while deviating more or less from the exact horizontal, i.e., when they are offset in height in some way.

The invention shall always be applicable when at least one weight of the ejected blown body is determined by a comparison between actual and reference values and when following the position check of at least one critical point the positioning unit carries out an automatic adjustment of the setpoint.

TABLE

Requirements on hollow bodies made by the extrusion blow procedure, for instance cans, barrels, plastic fuel containers (moter vehicle fuel tanks).

| Criterion # | | DWDS/ SFDR | wall-thickness position control | weight regulation | temperature | machine cycle and personnel | plastic material |
|---|---|---|---|---|---|---|---|
| | | | Predominantly affected by | | | | |
| 1. | Maintaining the minimum wall thickness | x | x | | | | |
| 2. | High long-term box compression | x | x | | | | |
| 3. | High coefficient, ie low deforming path in stacking | | x | | | | |
| 4. | High drop resistance | x | x | | x | x | x |
| 5. | Low warping and good dimensional stability | | x | | | | |
| 6. | Good resistance to stress cracks | x | | | | | x |
| 7. | Constant input weight | | | x | | | |
| 8. | Impermeability | | x | | | x | |
| 9. | Good surface | | | | x | | x | shall have priority.

As already mentioned above, an important aspect of the invention will now be emphasized. Position control by means of the lower waste-portion weight or by means of the sum of the individual weights is substantially more accurate than by means of the lower edge of the preformed items. In view of the interfering factors and the defects which may result from them, the position of the critical points may have to be corrected upon being sensed. If only one critical point is involved, the position control with simultaneous regulation of the hollow body net weight shall relate only to that point. But if two or more critical points are present, the most advantageous positional mean of all critical points must be ascertained. This adjustment can be carried out by setting a new reference weight for the lower waste-portion or for the sum of the individual weights, or the gross weight. If one critical point is involved, the position control with simultaneous regulation of the hollow body net weight relates only to that point. But if two or more critical points are present, the most advantageous mean of the position of all critical points must be ascertained and set. This adjustment can be carried out by manually setting a new reference weight for the lower waste-portion or for the sum of the individual weights or the gross weight of the blown body. Advantageously a new reference value shall be preset by a system measuring the actual value on the basis of the position check. In order to be able to forego comparison with a further weight value, the above described spacing control and/or regulation can be used at the preformed

I claim:

1. A method of extrusion blow-molding a hollow body comprising the steps of:
   (a) introducing thermoplastic material in an extruder head having a die discharge slit,
   (b) changing the slit width of the die discharge slit as a function of a wall thickness program for the hollow body, the wall thickness program including at least one critical cross section region,
   (c) extruding a tubular preformed article having at least one thickened wall portion corresponding to the critical cross sectional region of the wall thickness program,
   (d) expanding the preformed article in a blow mold to form a blown body therefrom,
   (e) ejecting the blown body from the blow mold,
   (f) dividing the blown body into at least the hollow body, an upper waste-portion and a lower waste-portion,
   (g) comparing the actual weight of the lower waste-portion with the corresponding reference weight of the lower waste-portion, and
   (h) adjusting the position of a thickened wall portion of a subsequent tubular preformed article and a corresponding portion of a hollow body expanded therefrom as a function of the weight comparison between the actual and reference weights of the lower waste-portion of step (g) by additionally changing the die slit width of the die slit of the extruder head in such manner that when expanding the subsequent preformed tubular article at least one critical cross section region of the blown body corresponding to the last-mentioned thickened wall portion shall be moved to a desired position in the blow mold.

2. The method as defined in claim 1 wherein at least one marking is provided on the preformed article and that an additional measurement value is obtained through marking detection on the blown body and the position of the marking on the blown body is analyzed.

3. The method as defined in claim 1 characterized in that an additional measurement value together with the comparison of the actual and reference weights of the lower waste-portion is used to adjust the position of the thickened wall portion and the weight of the blown body.

4. The method as defined in claim 3 wherein the weight of the blown body plus the lower waste-portion is used as an additional measurement value.

5. The method as defined in claim 2 wherein at least one marking is provided on the preformed article and that an additional measurement value is obtained through marking recognition on the preformed article and the position of the marking is analyzed.

6. The method as defined in claim 5 wherein a position difference between two markings at the preformed article is used as the additional measurement value.

7. The method as defined in claim 2 wherein a visual check is carried out to determine a position change of the marking.

8. The method as defined in claim 3 wherein the additional measurement value is in the form of a comparison between actual and reference values of the wall thicknesses of the hollow body.

9. A method of extrusion blow-molding a hollow body comprising the steps of:
   (a) introducing thermoplastic material in an extruder head having a die discharge slit,
   (b) changing the slit width of the die discharge slit as a function of a wall thickness program for the hollow body, the wall thickness program including at least one critical cross section region,
   (c) extruding a tubular preformed article having at least one thickened wall portion corresponding to the critical cross sectional region of the wall thickness program,
   (d) expanding the preformed article in a blow mold to form a blown body therefrom,
   (e) ejecting the blown body from the blow mold,
   (f) dividing the blown body into at least the hollow body, an upper waste-portion and a lower waste-portion,
   (g) measuring the actual weight of the hollow body lower waste-portion to form a control value for position determination of the critical cross sectional region in the hollow body, and
   (h) adjusting the position of a subsequent tubular performed article as a function of the control value of step (g) in that during subsequent operation at least one of the width of the die discharge slit and the speed of extrusion are changed in such manner that when expanding the subsequent preformed tubular article at least one critical cross section region of the blown body corresponding to the last-mentioned thickened wall portion shall be moved to a desired position in the blow mold.

10. The method as defined in claim 9 including the steps of:
   (a) measuring the actual net weight of the hollow body and comparing the actual net weight with the hollow-body reference weight,
   (b) adding the actual net weight of the hollow body and the actual weight of the lower waste-portion,
   (c) comparing the summed weight of step (b) with a corresponding referenced summed weight, and
   (d) utilizing the comparison value from step (c) to determine the position of a critical cross sectional region in a subsequent hollow body.

11. The method as defined in claim 9 wherein the extruder head is an accumulator head having a vertically adjustable hollow storage plunger which allows material storage in the accumulator during a storage stroke and, during accumulator head operation, the storage stroke is changed.

12. The method as defined in claim 9 wherein the extruder head operates continuously and, during continuous operation, the width of the die discharge slit is changed.

13. A method of extrusion-blow molding a hollow, thermoplastic body, comprising the steps of:
   a) introducing thermoplastic into an extrusion head which includes a die slit,
   b) changing the width of the die slit as a function of a wall-thickness program for the hollow body, said wall-thickness program including at least one critical cross-sectional region,
   c) extruding a tubular preformed article from the die slit of the extrusion head,
   d) expanding the preformed article in a blow mold into a blown body,
   e) ejecting the blown body from the blow mold,
   f) dividing the blown body at least into segments consisting of the hollow body, an upper waste-portion and a lower waste-portion,
   g) measuring the actual weight of at least one segment of the blown body different from the hollow body to form a control value for position-determination of the at least one critical cross-sectional region in the hollow body,
   h) adjusting the position of an at least one critical cross-sectional region in a subsequent hollow body as a function of the control value of step (g) in such a manner that, in accumulator-head operation, at least the width of the die slit, and in continuous extruder operation, at least an angular speed of a screw, is changed in such a manner that when expanding the preformed article, at least one critical cross-sectional region of the blown body is moved to a desired position in the blow mold.

* * * * *